Sept. 23, 1947.    C. J. BLOM    2,427,656
PUMP AND SHAFT SEAL THEREFOR
Filed Aug. 28, 1944    2 Sheets-Sheet 1

Inventor
Carl J Blom
By Lyon & Lyon
Attorneys

Sept. 23, 1947.     C. J. BLOM     2,427,656
PUMP AND SHAFT SEAL THEREFOR
Filed Aug. 28, 1944     2 Sheets-Sheet 2

Inventor
Carl J. Blom
By Lyon & Lyon
Attorneys

Patented Sept. 23, 1947

2,427,656

UNITED STATES PATENT OFFICE 2,427,656

PUMP AND SHAFT SEAL THEREFOR

Carl J. Blom, San Marino, Calif., assignor to Byron Jackson Co., Vernon, Calif., a corporation of Delaware Application August 28, 1944, Serial No. 551,560

4 Claims. (Cl. 103—111)

This invention relates generally to pumps and particularly to means for sealing the shaft opening in a pump of the type employed in circulating a liquid to be treated by an industrial process such as the refining of hydrocarbons.

It has heretofore been the custom to seal the shaft opening in a pump of the aforementioned type by means of a stuffing box, which is subject to a number of objections, chief of which are as follows:

A stuffing box is inherently not a perfect seal, inasmuch as some flow of liquid between the packing rings and the shaft is essential in order to lubricate the packing rings.

If the liquid being pumped is a volatile hydrocarbon or is of such other character that leakage thereof to the atmosphere must be avoided, it becomes necessary to employ a double packing with provision for injecting a sealing liquid between the inner and outer packings at a pressure higher than the pump liquid to which the inner packing is exposed.

A packed stuffing box requires frequent servicing to adjust the packing and replace worn packing rings.

In order to obtain sufficient breakdown of the pressure across the packing to reduce the leakage to a permissible amount, a double stuffing box is necessarily quite long if the suction pressure of the pump is fairly high. This adds materially to the overall length of the pump, which is objectionable from the standpoints of cost and installation space.

With the foregoing objections to stuffing boxes in mind, it is a general object of this invention to provide an improved pump shaft sealing means which is more satisfactory than those heretofore used from both manufacturing and operating standpoints.

It is a further object of this invention to provide pump shaft sealing means which will function for a long period of time without servicing.

It is still another object of this invention to provide pump shaft sealing means of such a character as to produce a short, compact pump unit occupying a minimum of space.

It is a still further object of this invention to provide sealing means for a pump shaft wherein outward leakage of pump fluid is prevented by interposing a sealing liquid between inner and outer seals of a double seal structure, and wherein the sealing liquid is subjected to a higher pressure than the pump liquid contacting the seal, without requiring auxiliary pumping apparatus.

It is still another object of this invention to provide a pump shaft sealing means of the double seal type with a sealing liquid interposed between the seals, and wherein the pressure of the sealing liquid is always maintained in predetermined relationship to the pressure of the pump liquid, irrespective of the absolute value of the pump liquid pressure.

A still further object of this invention is to provide a pump shaft seal of the double seal type with a sealing liquid interposed between the seals, and incorporating means for dissipating heat generated by friction between the relatively rotating sealing surfaces.

The invention has other objects and possesses other advantages which will be apparent from the following detailed description of a preferred embodiment thereof, reference being had to the accompanying drawing wherein.

Figure 1:
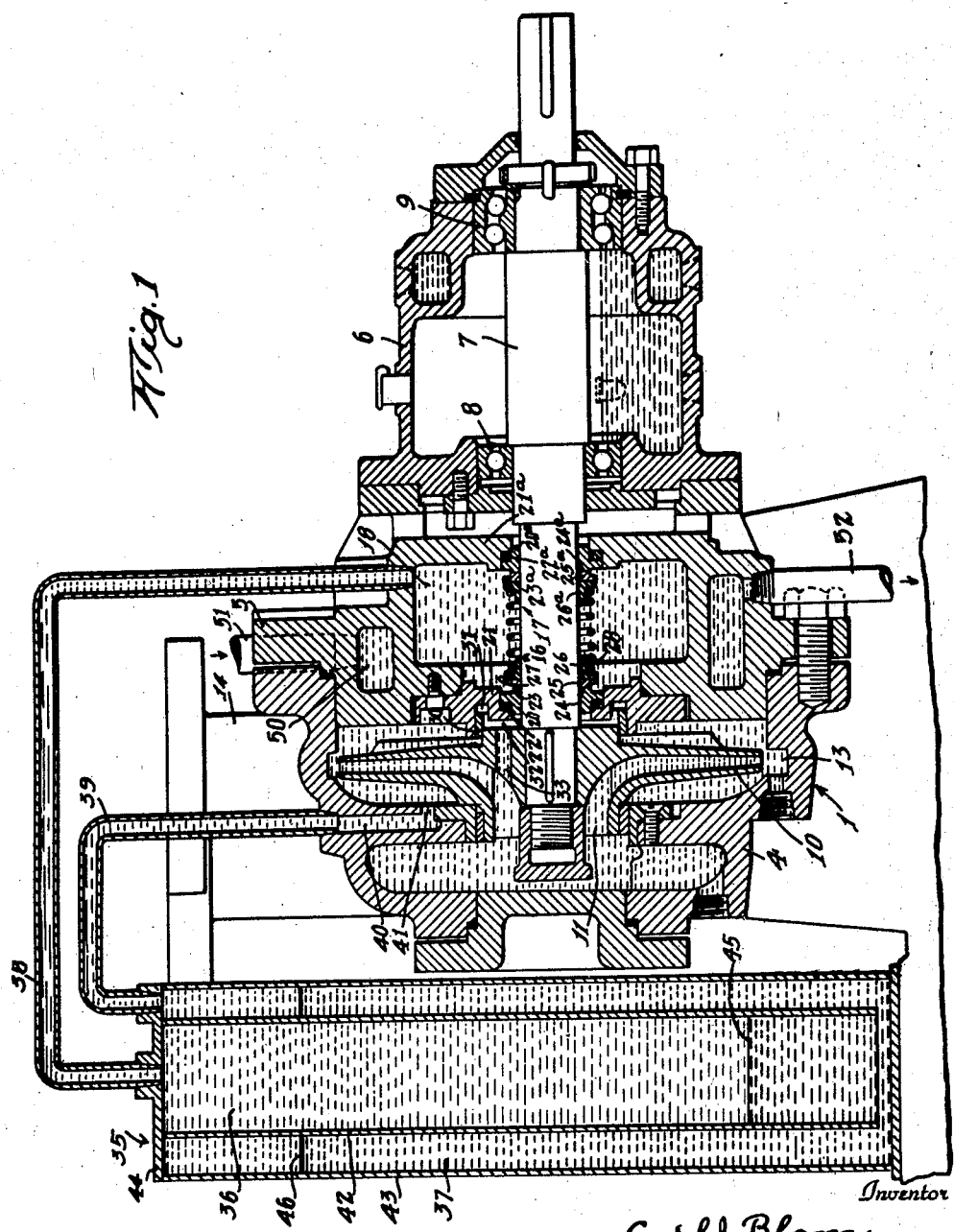
Fig. 1 is a sectional view, taken in a vertical axial plane, of a pump embodying the invention.

Referring to the drawing, a pump unit of the type under consideration usually comprises a pump, generally designated 1, and a driving motor 2, both mounted on a common base 3. The pump shown herein is of the single stage type although it will be apparent, as the description proceeds, that the invention is equally applicable to multistage pumps.

The pump case 4 is bolted or otherwise secured to the base, and has bolted thereto a seal bracket 5 to the outer side of which a bearing bracket 6 is secured. An impeller shaft 7 is supported in the bearing bracket 6 by axially spaced bearings 8 and 9 and extends through the seal bracket 5 and into the pump case. An impeller 10 is secured to the inner extremity of the shaft with its suction eye 11 in open communication with a suction nozzle 12 formed integral with the pump case. The impeller discharges into a volute 13 formed in the pump case and merging with a discharge nozzle 14, as is customary in centrifugal pumps. The impeller shaft 7 is connected in driving relation with the shaft of the motor 2 by a shaft coupling 15 of any well known construction.

In pumps of the general type described herein, it has heretofore been the general practice to seal the shaft opening in the pump case by a stuffing box which is usually of considerable length, thus requiring a bracket which extends outwardly a considerable distance from the pump case and materially increases the overall length of the unit. A typical example of this construction may be found in applicant's Patent No. 2,331,299, dated October 12, 1943.

In the present instance the seal bracket 5 is only of sufficient length to provide space for a shaft seal of the type generally referred to as a double mechanical seal. The term "mechanical seal," as used herein, refers to a shaft seal wherein the seal is effected between the abutting radial faces of a pair of relatively rotatable seal rings, one of which is stationary and is mounted in fluid-tight relation to the pump case or other housing through a wall of which the shaft extends, the other seal ring being mounted on the shaft to rotate therewith and being sealed thereto.

Referring to Fig. 1 of the drawing, the shaft seal shown therein is a double mechanical seal comprising a pair of inner and outer seals, generally designated 16 and 17, the inner seal 16 effecting a seal between the interior of the pump case 4 and a seal chamber 18 formed in the seal bracket 5, and the outer seal 17 effecting a seal between the seal chamber 18 and the atmosphere. The seals 16 and 17 are in all essential respects of identical construction. The inner seal 16 comprises a stationary seal ring 20 mounted on a closure plate 21 detachably secured to the inner wall of the seal bracket, and being sealed thereto by a gasket 22 of rubber, neoprene or the like. The gasket, being inherently resilient, not only effects a seal but also affords a self-aligning seat for the seal ring 20 which permits the ring to adjust itself and maintain uniform pressure over the entire area of contact between the radial sealing surface 23 and a cooperating radial sealing surface 24 on a seal ring 25 mounted on the shaft. The ring 25 is secured in fluid-tight relation to the shaft by a collar 26 of rubber, neoprene or the like. A sheet metal sleeve 27 is provided to maintain the ring 25 and the collar 26 in assembled relation, and a second sleeve 28 surrounds the neck portion of the collar and aids in maintaining frictional driving relation between the collar and the shaft.

The outer seal 17 comprises similar parts, including a stationary seal ring 20a mounted in fluid-tight relationship with the outer wall 21a of the seal chamber and having a sealing surface 23a, a gasket 22a between the seal ring and the wall 21a, and a rotating seal ring 25a mounted on the shaft and having a sealing surface 24a in sealing engagement with the surface 23a, the ring 25a being secured in fluid-tight relationship to the shaft by a rubber or neoprene collar 26a. The rotating seal rings 25 and 25a are urged into sealing engagement with their respective stationary seal rings by a compression spring 29 surrounding the shaft and interposed between the flange portions of the collars 26 and 26a.

It will be observed that in the embodiment illustrated in Fig. 1, a wear ring 30 is provided on the rear side of the impeller hub, having close running clearance with a bore 31 in the closure plate 21, thus providing a narrow throttle passage between the impeller chamber of the pump case and a chamber 32 formed between the impeller and the closure plate 21. A port 33 extends through the impeller to establish communication between the chamber 32 and the suction eye 11 of the impeller, thus maintaining the pressure in the chamber 32 substantially at the suction pressure of the pump. The pump chamber side of the inner seal 16 is thus exposed to pump liquid substantially at suction pressure.

Figure 2:
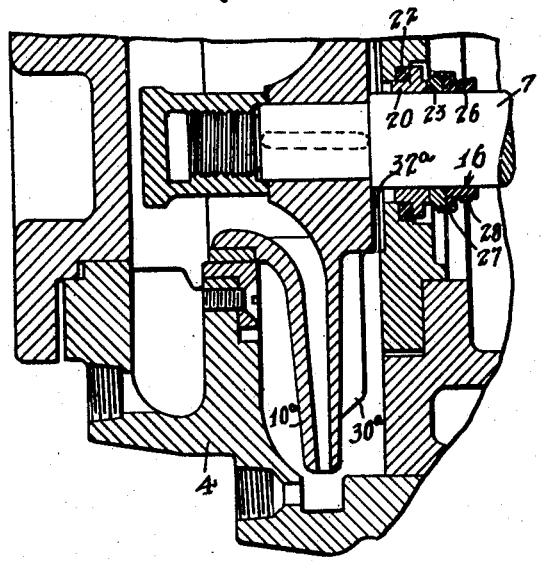
Fig. 2 is a fragmentary view of a modified pump construction.
Figure 3:
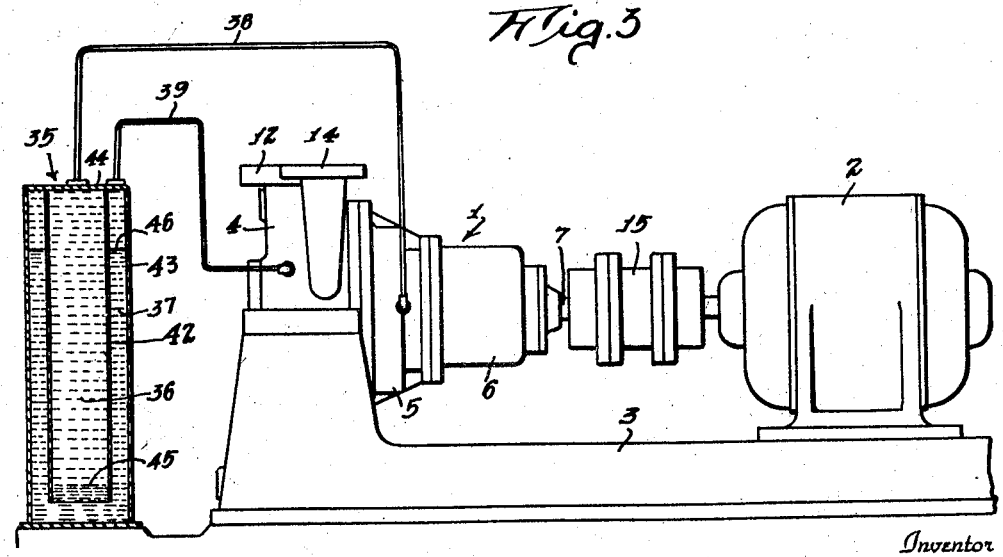
Fig. 3 is a side elevation of a complete pump unit, with the pressure transfer unit shown schematically.

The pressure of the pump liquid contacting the inner seal 16 may, if desired, be reduced below the discharge pressure in other ways than by throttling. Thus, in Fig. 2 the impeller 10a is provided with radially extending ribs 30a on its rear face, which in effect constitute an auxiliary pump creating a low pressure zone at 32a adjacent the seal 16. In this construction the wear ring 30 and the port 33 of Fig. 1 are dispensed with. It will be obvious that various other expedients may be resorted to for creating a low pressure zone at 32 or 32a, and hence I do not wish to be limited to either of the specific means shown.

A pump of the foregoing type is often employed to pump volatile hydrocarbons or other liquids of such nature that their escape to the atmosphere would be dangerous or otherwise objectionable. In the present instance, this is avoided by maintaining a body of sealing liquid such as oil or other harmless liquid in the seal chamber, at a pressure somewhat higher than the pressure of the pump liquid contacting the inner seal 16. In this manner, any leakage between the seal faces 23 and 24 will be of sealing liquid into the pump chamber, rather than of pump liquid in an outward direction. The sealing liquid may, if desired, be supplied from an independent source at the desired pressure, but I prefer to utilize the pressure developed by the pump 1 to subject the sealing liquid to pressure. The advantages of this latter arrangement over the former are twofold, viz: (a) it eliminates the necessity of providing auxiliary pumping equipment with pressure regulating apparatus for varying the pressure of the sealing liquid in accordance with the pump suction pressure, and (b) a predetermined pressure differential is maintained across the inner seal irrespective of the suction pressure of the pump.

Referring to the drawing, it will be observed that a balance chamber, generally designated 35, is mounted adjacent the pump and is so constructed as to provide two chambers 36 and 37 communicating with each other at their lower ends, the chamber 36 being connected at its upper end by a conduit 38 to the seal chamber 18 and the chamber 37 being connected at its upper end, by a conduit 39 and passages 40 and 41 in the pump case 4, with the impeller chamber of the pump. The chamber 36 contains a body of sealing liquid, while the chamber 37 contains pump liquid, at least in its upper portion, at substantially the discharge pressure of the pump. In the present instance the chambers 36 and 37 are formed by concentric inner and outer cylinders 42 and 43, the outer cylinder 43 being closed at its ends and the inner cylinder 42 being open at its lower end and being secured in fluid-tight relation to the closure plate 44 closing the upper end of the outer cylinder. It will be apparent, however, that the cylinders may, if desired, be arranged side by side instead of one within the other, with a conduit extending between their lower ends.

In some instances, the sealing liquid and the pump liquid may be relatively immiscible and may be of sufficiently differing specific gravities to enable the two liquids to contact each other in the balance chamber, and thus transmit the pressure of the pump liquid directly to the sealing liquid. However, in many instances, such as when the pump is handling hydrocarbons, it is highly desirable to use as a sealing liquid an oil which is readily miscible with the pump liquid, in order that any small amount of sealing liquid which may leak past the seal 16 and into the pump liquid may mix therewith without objectionably contaminating the pump liquid. Under these circumstances, I have found it not only desirable but necessary to interpose a body of intermediate liquid between the bodies of pump liquid and sealing liquid in the balance chamber 35. This intermediate liquid may be water or any other suitable liquid which is of greater specific gravity than either the pump liquid or the sealing liquid and which is relatively immiscible with each of those liquids.

Some slight leakage of sealing liquid outwardly of the seal chamber through both seals 16 and 17 is anticipated, and hence it is desirable to provide an appreciable reservoir of sealing liquid in the balance chamber. The inner chamber 36 is, therefore, preferably nearly filled with sealing liquid, the interface between the sealing liquid and the intermediate liquid being indicated at 45. As the interface 45 gradually rises in the chamber 36, the body of intermediate liquid is gradually transferred from the chamber 37 to the chamber 36, and hence the interface between the intermediate liquid and the pump liquid is initially near the upper end of the chamber 37, as indicated at 46.

It is preferred not to allow any of the intermediate liquid to be forced over into the seal chamber 18, even in the event that all of the sealing liquid should be displaced from the balance chamber by unforeseen excessive leakage of the seals 16 and 17. This would be highly undesirable inasmuch as some of the intermediate liquid might thereafter leak past the inner seal 16 and contaminate the pump liquid. In order to avoid this contingency, I prefer to so proportion the amount of intermediate liquid in the balance chamber that before the interface 45 rises to the upper end of the inner chamber 36, the interface 46 will be lowered to the level of the lower open end of the inner chamber. Thereafter, any subsquent displacement of sealing liquid from the chamber 36 will cause the lighter gravity pump liquid to pass inwardly beneath the lower edge of the inner cylinder 42 and bubble up through the heavier intermediate liquid. It will be understood, of course, that the foregoing contingency is very remote, as leakage of sealing liquid through the seals 16 and 17 is only of a minute order and suitable precautions may be provided to anticipate such a condition, such as a sight glass to indicate the level of the interface 46, and possibly an automatically controlled sealing liquid injector operable when the interface 45 rises to a predetermined level.

During operation of the pump, the friction between the sealing surfaces 23, 24 and 23a, 24a of the seals 16 and 17 generates heat which should be dissipated. For this purpose, an annular channel 50 is provided in the seal bracket 5 surrounding the seal chamber 18. Cooling liquid such as water may be circulated through the channel from a suitable source, the inlet and outlet connections to the channel being indicated at 51 and 52 respectively. The heat generated by friction between the seal plates is thus transmitted to the sealing liquid in the chamber 18, which in turn transfers it to the walls of the chamber which are cooled by the circulating cooling liquid.

The operation of the sealing means and the pressure transfer means should be apparent from the foregoing description. When the pump is idle, and under no pressure, there is obviously no pressure difference across either seal, disregarding the negligible head of the column of sealing liquid in the vertical leg of the conduit 38. When the pump is idle but is connected, through its suction and discharge nozzles 12 and 14, into a closed fluid system under pressure, the pressure of the sealing liquid will be equal to the pressure of the pump liquid in the chamber 32, and hence there will be no pressure differential across the inner seal 16. There will, however, be a pressure differential across the outer seal 17 equal to the gage pressure of the fluid system. When the pump is in operation, the pressure differential across the inner seal 16 will be substantially equal to the pressure developed by the pump (discharge pressure minus suction pressure), while the pressure differential across the outer seal will be the discharge pressure of the pump.

While I have shown the improved sealing means applied to a single stage pump, it will be understood that it is equally applicable to multi-stage pumps. In this event, the pressure differential across the inner seal may be either single stage pressure or the pressure developed by any number of stages, by connecting the conduit 39 to the proper impeller chamber.

It will be apparent from the foregoing detailed description of a preferred embodiment of the invention and a modification thereof that there has been provided an extremely compact, simple and trouble-free shaft sealing arrangement for pumps, particularly for pumps adapted to handle hydrocarbons or other liquids which for any reason should not be permitted to leak to the atmosphere. From an operating standpoint, the seals are capable of functioning for very long periods without servicing or attention of any sort, the leakage being very nominal and of the order of only a few gallons per year. With a pressure transfer arrangement as shown, the pressure differential across the inner seal is substantially constant irrespective of the absolute suction pressure of the pump.

The shaft sealing arrangement described herein is particularly advantageous in a pump of the type wherein the pump shaft is supported in bearings positioned only at one side of the impeller. The spacing between the bearings 8 and 9 must be approximately equal to the length of the overhanging shaft between the impeller and the innermost bearing, and hence any reduction in the overhang by the use of an axially compact shaft seal may also be accompanied by a corresponding reduction in the length of the bearing bracket. The reduction in overhang, made possible by the compact shaft seal structure, is also beneficial from another important standpoint. With a reduced overhang the bending moment on the overhanging shaft section, due to the weight of the impeller, is correspondingly reduced, and a smaller shaft may be employed. The hydraulic thrust exerted on the shaft in an axial direction is the product of the fluid pressure times the cross-sectional area of the shaft. Consequently, by reducing the shaft size the axial thrust is reduced and a smaller thrust bearing may be employed.

Other advantages inherent in a device constructed in accordance with this invention will be apparent to those skilled in the art.

I claim:

1. A pump comprising an open-ended casing, a closure member secured to the casing and having an inner wall cooperating with the casing to define a pumping chamber, said closure member having an outer well spaced axially from the inner wall and cooperating therewith to define a seal chamber, an impeller shaft extending through aligned openings in the walls of said closure member and having an impeller mounted on one end thereof in said pumping chamber and being supported solely at points beyond the outer wall of said closure member, a pair of stationary sealing elements mounted in fluid-tight relationship to one of said walls and in coaxial relation to the shaft and each having a substantially radial sealing surface, a pair of sealing elements mounted on the shaft in fluid-tight relationship thereto and each having a substantially radial sealing surface in sealing engagement with the sealing surfaces on the stationary sealing elements, a body of sealing liquid in said seal chamber, means for subjecting the sealing liquid to the pressure of the pump liquid in a high pressure zone of said pumping chamber, and means for subjecting the inner side of the sealing elements associated with said inner wall to the pressure of the pump liquid in a low pressure zone of said pumping chamber.

2. A pump comprising an open-ended casing, a closure member secured to the casing and having an inner wall cooperating with the casing to define a pumping chamber, said closure member having an outer wall spaced axially from the inner wall and cooperating therewith to define a seal chamber, an impeller shaft extending through aligned openings in the walls of said closure member and having an impeller mounted on one end thereof in said pumping chamber and being supported solely at points beyond the outer wall of said closure member, a pair of stationary sealing elements each mounted in fluid-tight relationship to one of said walls and in coaxial relationship to the shaft and each having a substantially radial sealing surface, a pair of sealing elements mounted on the shaft in fluid-tight relationship thereto and each having a substantially radial sealing surface in sealing engagement with the sealing surfaces on the stationary sealing elements, a body of sealing liquid in said seal chamber, means for subjecting the sealing liquid to the pressure of the pump liquid in a high pressure zone of said pumping chamber, means for subjecting the inner side of the sealing elements associated with said inner wall to the pressure of the pump liquid in a low pressure zone of said pumping chamber, and means for dissipating the heat of friction between the relatively rotatable sealing surfaces of said sealing elements, said means comprising an annular fluid passage formed in said closure member and surrounding the seal chamber, and means for admitting cooling liquid from a source to said passage.

3. A pump comprising an open-ended casing, a closure member secured to the casing and having an inner wall cooperating with the casing to define a pumping chamber, said closure member having an outer wall spaced axially from the inner wall and cooperating therewith to define a seal chamber, an impeller shaft extending through aligned openings in the walls of said closure member and having an impeller mounted on one end thereof in said pumping chamber and being supported solely at points beyond the outer wall of said closure member, a pair of stationary sealing elements mounted in fluid-tight relationship to one of said walls and in coaxial relation to the shaft and each having a substantially radial sealing surface, a pair of sealing elements mounted on the shaft in fluid-tight relationship thereto and each having a substantially radial sealing surface in sealing engagement with the sealing surfaces on the stationary sealing elements, a body of sealing liquid in said seal chamber, walls forming a chamber containing pressure-transferring bodies of pump liquid and sealing liquid communicating respectively with a high pressure zone of said pumping chamber and with said seal chamber whereby the body of sealing liquid in said seal chamber is subjected to the pressure of the pump liquid in said high pressure zone, and means for subjecting the inner side of the sealing elements associated with said inner wall to the pressure of the pump liquid in a low pressure zone of said pumping chamber.

4. A pump comprising an open-ended casing, a closure member secured to the casing and having an inner wall cooperating with the casing to define a pumping chamber, said closure member having an outer wall spaced axially from the inner wall and cooperating therewith to define a seal chamber, an impeller shaft extending through aligned openings in the walls of said closure member and having an impeller mounted on one end thereof in said pumping chamber and being supported solely at points beyond the outer wall of said closure member, a pair of stationary sealing elements each mounted in fluid-tight relationship to one of said walls and in coaxial relation to the shaft and each having a substantially radial sealing surface, a pair of sealing elements mounted on the shaft in fluid-tight relationship thereto and each having a substantially radial sealing surface in sealing engagement with the sealing surfaces on the stationary sealing elements, a body of sealing liquid in said seal chamber, walls forming a first chamber containing a body of pump liquid in its upper portion and a second chamber containing a body of sealing liquid in its upper portion, said chambers communicating with each other at their lower ends and each containing in their lower portions a body of isolating liquid in pressure transfer relation with the bodies of pump liquid and sealing liquid in the upper portions of the respective chambers, conduit means communicating the upper portion of said first chamber with a high pressure zone of said pumping chamber, conduit means communicating the upper portion of said second chamber with said seal chamber, and means for subjecting the inner side of the mechanical seal elements associated with said inner wall to the pressure of the pump liquid in a low pressure zone of said pumping chamber.

CARL J. BLOM.

REFERENCES CITED

The following references are of record in the file of this patent:

UNITED STATES PATENTS

| Number | Name | Date |
|---|---|---|
| 715,064 | Hedlund | Dec. 2, 1902 |
| 879,484 | Morterud | Feb. 18, 1908 |
| 1,156,063 | Daniel | Oct. 12, 1915 |
| 1,910,811 | Peterson | May 23, 1933 |
| 2,107,260 | Ihara | Feb. 1, 1938 |
| 2,129,069 | Roberts | Sept. 6, 1938 |
| 2,244,450 | Ernie | June 3, 1941 |
| 2,257,011 | Hiller | Sept. 23, 1941 |
| 2,331,641 | Walker | Oct. 12, 1943 |

Certificate of Correction

Patent No. 2,427,656.                                           September 23, 1947.

CARL J. BLOM

It is hereby certified that error appears in the printed specification of the above numbered patent requiring correction as follows: Column 6, line 68, claim 1, for the word "well" read *wall*; and that the said Letters Patent should be read with this correction therein that the same may conform to the record of the case in the Patent Office.

Signed and sealed this 6th day of January, A. D. 1948.

[SEAL]

THOMAS F. MURPHY,
*Assistant Commissioner of Patents.*